United States Patent Office 2,794,767
Patented June 4, 1957

---

2,794,767

REFINING PROCESS INCLUDING REGENERATION OF USED ALKALINE REAGENTS

William K. T. Gleim, Orland Park, and Peter Urban, Chicago, Ill., assignors to Universal Oil Products Company, Des Plaines, Ill., a corporation of Delaware No Drawing. Application November 3, 1954, Serial No. 466,658

4 Claims. (Cl. 196—32)

This invention relates to the regeneration of used alkaline reagents and more particularly to an improvement in the method of effecting the regeneration of alkaline reagents which have been used in the treatment of hydrocarbon or other organic compositions for the removal of acidic components and particularly sulfur-containing impurities.

Hydrocarbon or other organic compositions containing sulfur compounds and other acidic impurities may be treated with an alkaline reagent in order to remove the impurities. Any suitable alkaline reagent may be employed including particularly sodium hydroxide (caustic), potassium hydroxide, etc. The alkaline reagent generally is utilized as an aqueous solution of from about 5% to about 50% weight concentration and, when desired, solutizers, solubilizing agents, etc., are employed including, for example, alcohols and particularly methanol, ethanol, etc., phenols, cresols, butyric acid, etc., in order to increase the contact and/or reaction of the acidic components with the alkaline reagent.

The alkaline solutions are especially suitable for the purification of hydrocarbon fractions and particularly sour gasolines including cracked gasoline, straight run gasoline or mixtures thereof, naphtha, jet fuel, kerosene, aromatic solvent, stove oil, range oil, burner oil, fuel oil, etc. Other hydrocarbon fractions include lubricating oil, gas oil, etc., as well as normally gaseous fractions. In addition, other organic fractions containing acidic impurities which may be treated in this manner include, for example, alcohols, ketones, aldehydes, etc.

After the hydrocarbon or other organic fraction has been contacted with the alkaline reagent and the acidic components reacted with and/or absorbed in the alkaline reagent, the purified fraction is separated from the alkaline solution. The alkaline solution then is sent for regeneration in order to remove the acidic components and to restore the activity of the alkaline reagent for further use in the process.

It heretofore has been proposed to regenerate the alkaline solution by oxidizing with air or other oxygen-containing gas. However, in order to get sufficient regeneration of the alkaline solution, it has been necessary to resort to extremely high temperatures. The use of high temperatures is objectionable because it causes extensive damage to the plant equipment. We now have found that satisfactory regeneration of the spent alkaline solution may be effected by oxidizing the same in the presence of a particular catalyst.

In one embodiment the present invention relates to a method of regenerating alkaline reagents used for the removal of acidic components from organic compounds, which comprises oxidizing the alkaline reagent in the presence of a charcoal catalyst.

In a specific embodiment the present invention relates to a method of regenerating caustic solution used for the removal of mercaptans from gasoline which comprises oxidizing the used caustic solution in the presence of a charcoal catalyst.

The purification of the hydrocarbon or other organic compositions to remove acidic components generally is effected at ambient temperature, although higher temperatures which generally will not exceed about 200° F. may be employed when desired. The purification treatment may be effected in either batch or continuous operation. In either case, the alkaline solution containing the acidic components is separated from the purified hydrocarbon fraction and is subjected to regeneration.

In accordance with the present invention, regeneration of the used alkaline solution is effected in the presence of a charcoal catalyst. Any suitable charcoal catalyst may be employed. Illustrative charcoals include bone char, wood charcoal, charcoal made from coconut or other nut shells, fruit pits, etc. It is understood that any suitable charcoal may be employed in the present invention.

Regeneration of the used alkaline reagent may be effected in any suitable manner and either in batch or continuous operation. In a continuous process, for example, the used alkaline reagent is continuously supplied to a regeneration zone containing charcoal and/or to which charcoal is continuously or intermittently introduced. Air, oxygen or other oxidizing gas is supplied to the regeneration zone. The amount of charcoal to be used in the regeneration zone may vary considerably and will depend upon the particular alkaline reagent and the acidic impurities. The amount of charcoal may range from about 0.001% to 20% or more of the alkaline reagent. The regeneration may be effected at ambient temperature or at elevated temperature which generally will not exceed about 200° F. In the regeneration the alkaline solution is substantially restored to the original composition. Thus, for example, in the regeneration of caustic solution, sodium mercaptides are oxidized to sodium hydroxide. The mercaptans or other acidic compounds formed or present in the regeneration are withdrawn as an overhead fraction and either vented or utilized for any desirable purpose. The regenerated alkaline solution is withdrawn from the regeneration zone and preferably is continuously returned to the treating zone for further use in the purification of the hydrocarbon distillate. The presence of charcoal in the hydrocarbon distillate may be objectionable and, in a preferred embodiment, the regenerated caustic solution is filtered, settled or otherwise treated to insure that it is free from entrained charcoal.

Another advantage to the process of the present invention is that the acidic components and particularly sulfur compounds are transferred from the hydrocarbon phase to the alkaline reagent phase and thereby will be removed from the hydrocarbon distillate. This is of particular advantage in the treatment of gasoline, for example, because the sulfur compounds are not allowed to remain in the gasoline as occurs in some treating processes in which the mercaptans are oxidized to disulfides which, in turn, are dissolved in the gasoline. The presence of sulfur compounds is detrimental on the octane number of gasoline and is objectionable for this and other reasons. Still another advantage to the present invention is that the alkaline solution is regenerated and thereby avoids the problem of disposing of the spent alkaline solution. Because of possible pollution of water streams, strict restrictions are placed on the discharge of spent alkaline solutions into such streams.

The regeneration step may be improved by the addition of a liquid immiscible with the caustic but capable of dissolving certain disulfides. In particular, petroleum fractions often contain thiophenol which is absorbed by the alkaline solution. The oxidation of the thiophenol on the surface of the charcoal results in the formation of diphenyl-disulfide, a solid which occludes the catalyst and destroys its activity. The addition of a small amount of hydrocarbon to the caustic during the air regeneration would dissolve the diphenyl-disulfides and render the catalyst active again. When the regenerated alkaline solution is settled, the oil is decanted.

The following examples are introduced to illustrate further the novelty and utility of the present invention but not necessarily with the intention of unduly limiting the same.

*Example I*

This run was made with n-butyl mercaptan and 12% aqueous sodium hydroxide solution. 6.5 ml. of liquid n-butyl mercaptan was commingled with 400 ml. of 12% aqueous caustic solution and the mixture was agitated to form a homogeneous solution. The solution was divided into two portions of 200 ml. each. One portion was utilized as the blank or control sample and 0.2 grams charcoal was added to the other portion. The charcoal used in this example was Norite A which is available commercially.

The two portions were each separately blown with air at room temperature, and the mercaptan content determined by titrating with silver nitrate solution.

After 30 minutes of such treatment, the blank or control sample still had a mercaptan content of 90%. In contrast the sample containing the charcoal, after 30 minutes had a mercaptan content of 22%.

*Example II*

This example was conducted in the same manner as described in Example I except that a 15% aqueous potassium hydroxide solution was utilized.

After 30 minutes the blank or control sample had a mercaptan content of 79%, whereas the sample containing the charcoal had a mercaptan content of 34% after 30 minutes.

*Example III*

In this example the mercaptan used was tert-buyl-mercaptan and the run was conducted in the same manner as described in Example I except that the alkaline solution comprised a 30% aqueous sodium hydroxide solution.

After 30 minutes the blank or control sample contained 58% mercaptan, whereas the solution containing the charcoal contained 23% mercaptan. It is noted that the mercaptan content was reduced more than one-half by treatment in accordance with the present invention.

*Example IV*

Cracked gasoline containing mercaptans may be treated with a 10% aqueous caustic solution in a continuous process. The aqueous caustic solution is introduced near the top of the treating zone while the gasoline is introduced near the bottom thereof. These streams pass countercurrently to each other. The treated gasoline is withdrawn from the upper portion of the treating zone, while the used caustic solution is withdrawn from the lower portion of the treating zone. The used treating reagent is supplied to a regeneration zone containing a bed of charcoal, and air is continuously introduced near the lower portion of the regeneration zone. The sodium mercaptides are converted to sodium hydroxide in the regeneration zone, and the mercaptans and other acidic components are withdrawn, along with excess air, from the upper portion of the regeneration zone.

The regenerated caustic solution is withdrawn from the lower portion of the regeneration zone and is passed through a filter zone to insure removal of entrained charcoal. Water is added to the filtered reagent solution in order to form a solution of the original concentration, and this solution is then supplied to the purification zone for further use in the treatment of cracked gasoline.

We claim as our invention:

1. The process which comprises purifying sour gasoline by treating with an aqueous caustic solution, separating the used caustic solution from purified gasoline, regenerating the separated used caustic solution in the absence of the purified gasoline by oxidizing the same in the presence of a charcoal catalyst, and subsequently reusing the regenerated caustic solution for treating additional quantity of sour gasoline.

2. The process of claim 1 further characterized in that said regenerated caustic solution is treated to remove entrained charcoal before reusing the caustic solution for treating additional quantity of gasoline.

3. The process of claim 2 further characterized in that the treatment of the regenerated caustic solution is effected by filtering.

4. In the removal of sulfur compounds from hydrocarbon distillate by treatment with caustic solution which is then separated from the treated distillate, the method of regenerating the separated caustic solution containing sulfur compounds which comprises subjecting the same to oxidation in the presence of a charcoal catalyst and in the absence of the treated distillate.

References Cited in the file of this patent

UNITED STATES PATENTS

| | | |
|---|---|---|
| 1,098,764 | Richter | June 2, 1914 |
| 1,890,516 | Lachman | Dec. 13, 1932 |
| 1,943,744 | Rosenstein | Jan. 16, 1934 |